United States Patent [19]

Wu

[11] Patent Number: 5,764,151
[45] Date of Patent: Jun. 9, 1998

[54] NETWORK HUB WITH A VOICE FUNCTION CONTROL UNIT

[75] Inventor: Robert Chin-Yi Wu, Hsinchu, Taiwan

[73] Assignee: Accton Technology Corporation, Hsinchu, Taiwan

[21] Appl. No.: 805,567

[22] Filed: Feb. 25, 1997

[30] Foreign Application Priority Data

Oct. 18, 1996 [TW] Taiwan ................... 85216082

[51] Int. Cl.6 ................................. G08B 21/00
[52] U.S. Cl. ............... 340/635; 340/693; 375/228; 375/377; 307/116; 361/679
[58] Field of Search .................. 340/635, 693; 370/407, 445; 375/224, 228, 377; 379/113, 140, 177–179; 455/67.1, 67.7; 361/679, 826; 307/112, 116; 395/561

[56] References Cited

U.S. PATENT DOCUMENTS

| | | | |
|---|---|---|---|
| 4,558,181 | 12/1985 | Blanchard et al. | 379/88 |
| 4,977,390 | 12/1990 | Saylor et al. | 340/635 |
| 5,287,399 | 2/1994 | Jackson et al. | 375/219 |
| 5,619,500 | 4/1997 | Hiekali | 370/414 |

*Primary Examiner*—Brent A. Swarthout
*Assistant Examiner*—Daniel J. Wu
*Attorney, Agent, or Firm*—Morton J. Rosenberg; David I. Klein; Jun Y. Lee

[57] ABSTRACT

A network hub or a network switch including a housing which holds all elements of the network hub; a trunk interface control unit which is the control center of the network hub for controlling the operation of the other units of the network hub; a power supply unit connected to the trunk interface control unit to provide the network hub with the necessary operating power; a plurality of modular jacks adapted for receiving network lines for data input and output; a plurality of data handling units respectively connected between the trunk interface control unit and the modular jacks for handling input data and output data; a functional operand unit connected to the trunk interface control unit for calculating network line connection condition, network line utilization rate, data collision rate and network line inspection condition; a voice function control unit connected to the trunk interface control unit for controlling the functional operand unit to output its computed result, and a LED controller controlled by the functional operand unit to drive indicator lights for indication of different network line conditions.

7 Claims, 5 Drawing Sheets

NETWORK HUB WITH A VOICE FUNCTION CONTROL UNIT

BACKGROUND OF THE INVENTION

The present invention relates to network hub for network lines, and more particularly to such a network hub or a network switch with voice function control unit for reporting network line conditions by voice.

Regular network hubs or network switches are commonly equipped with indicator lights for indicating different network line conditions. When it is necessary to know the conditions of the connected network lines, the network supervisor or administrator shall have to look at the indicator lights of the network hub. If a particular network condition occurs when the network supervisor is not at the site, much time may be wasted and much data may be lost before the condition is reported to the network supervisor or administrator.

SUMMARY OF THE INVENTION

The present invention provides a network hub for computer networks which eliminates the aforesaid drawbacks. It is one object of the present invention to provide a network hub with voice function control unit that reports the conditions of the network lines by voice, and a set of indicator lights (i.e. LEDs or LED array) that indicate the conditions of the network lines by light. It is another object of the present invention to provide a network hub with a voice output control button for enabling the network hub to report the conditions of the network lines by voice when desired.

According to one aspect of the present invention, the network hub comprises a housing which holds all elements of the network hub; a trunk interface control unit which is the control center of the network hub for controlling the operation of the other units of the network hub; a power supply unit connected to the trunk interface control unit to provide the network hub with the necessary operating power; a plurality of modular jacks adapted for receiving network lines for data input and output; a plurality of data handling units respectively connected between the trunk interface control unit and the modular jacks for handling input data and output data; a functional operand unit connected to the trunk interface control unit for calculating network line connection condition, network line utilization rate, data collision rate and network line inspection condition; a voice function control unit connected to the trunk interface control unit for controlling the functional operand unit to output its computed result, and a LED controller controlled by the functional operand unit to drive indicator lights for indication of different network line conditions.

According to another aspect of the present invention, the network hub further comprises a voice output control button for voice output on/off control.

DETAILED DESCRIPTION OF THE PREFERRED EMBODIMENT

Figure 1:
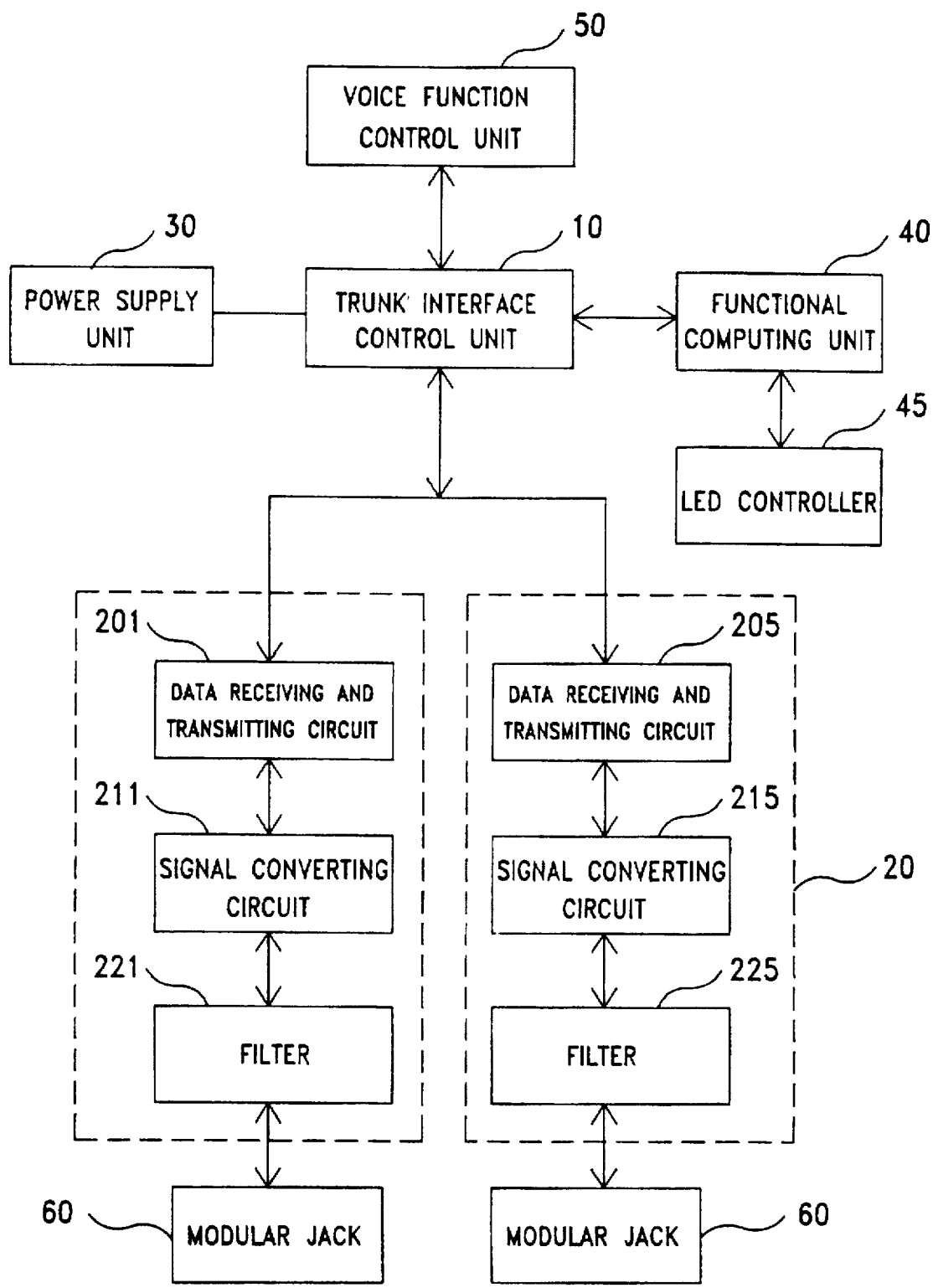
FIG. 1 is a structured block diagram of a network hub according to the present invention.

Referring to FIG. 1, the present invention is generally comprised of a trunk interface control unit 10 which is the control center of the network hub for controlling the operation of the other units of the network hub, a power supply unit 30 connected to the trunk interface control unit 10 to provide the network hub with the necessary operating power, a plurality of modular jacks 60 adapted for receiving network lines for data input and output, a plurality of data handling units 20 respectively connected between the trunk interface control unit 10 and the modular jacks 60 for handling input data and output data, a voice function control unit 50 connected to the trunk interface control unit 10, a LED controller 45, and a functional operand unit 40 connected to the trunk interface control unit 10 for calculating network line connection condition, network line utilization rate, data collision rate and network line inspection condition, and sending the calculated result to the LED controller 45 and the voice function control unit 50.

Network lines are connected to the modular jacks 60, so that data input and output are achieved by the trunk interface control unit 10 through the data handling units 20. The data handling units 20 each comprise a data functional operand unit 201 (205), a signal converting device 211 (215) and a filter 221 (225) respectively connected in series. The filter 221 (225) is connected to one modular jack 60 to remove noise from network signal, permitting the network signal to be further processed through the signal conversion device 211 (215) and the data functional operand unit 201 (205), and then sent to the trunk interface control unit 10. Upon receipt of the signal, the trunk interface control unit 10 sends the received network signal to the functional operand unit 40 subject to its time sequence, so that the functional operand unit 40 calculates current network line connection conditions, network line utilization rate, data collision rate and line inspection conditions. The calculation result is then sent from the functional operand unit 40 to the LED controller 45 for visual display, or sent back to the trunk interface control unit 10 for voice output through the voice function control unit 50.

Figure 2:
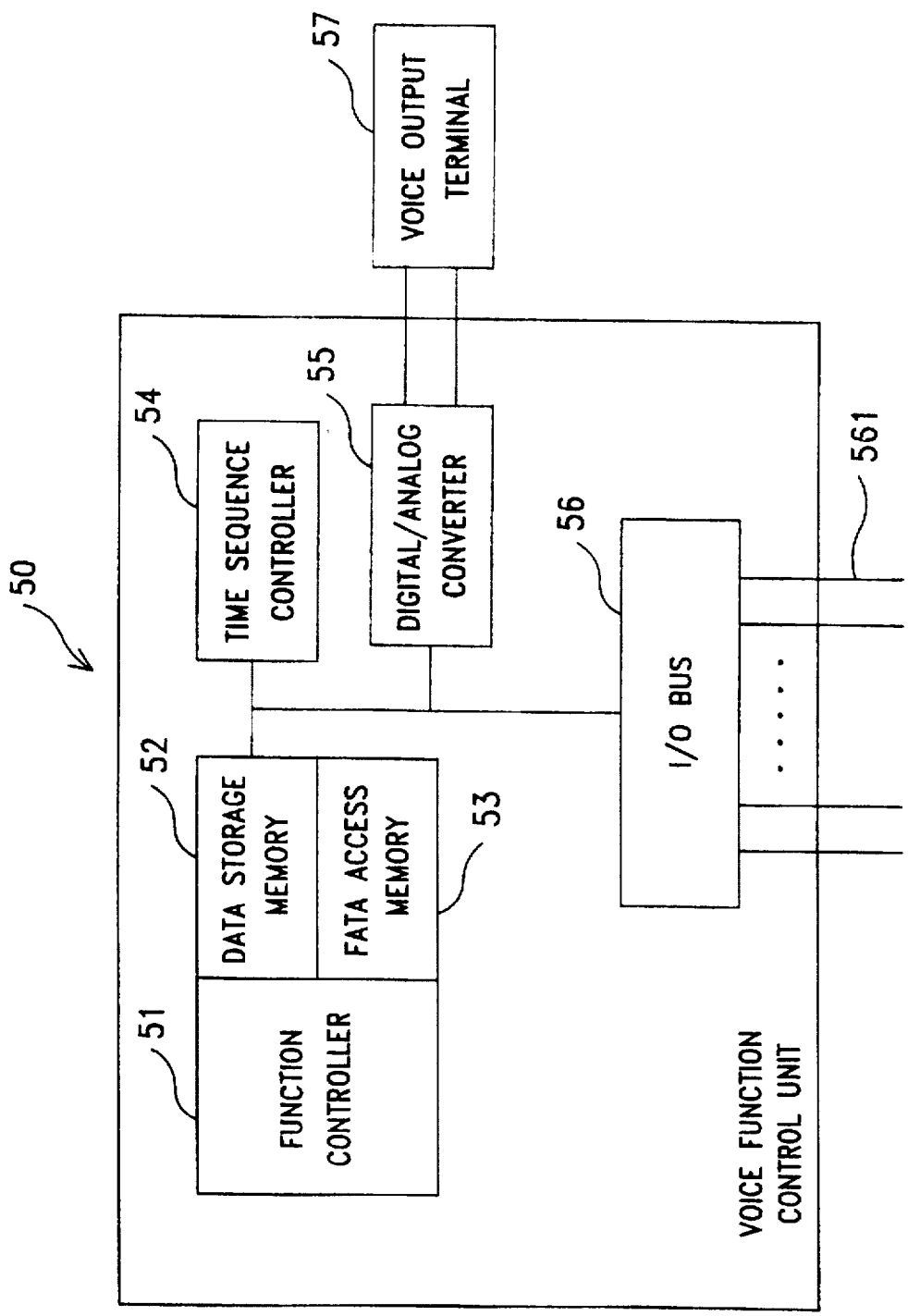
FIG. 2 is a structured block diagram of a voice function control unit according to the present invention.

Referring to FIG. 2, the voice function control unit 50 comprises an I/O bus 56, a function controller 51, a data storage memory device 52, a data access memory device 53, a time sequence controller 54, a digital/analog converter 55, and a voice output terminal 57. The I/O bus 56 is connected to the aforesaid trunk interface control unit 10 by contact pins 561, so that the trunk interface control unit 10 can control the voice function control unit 50 for voice output. The data storage memory device 52 is connected to the I/O bus 56. The data storage memory device 52, the data access memory device 53, and the function controller 51 are connected into a loop. Network condition signals from the aforesaid functional operand unit 40 are sent, by means of the control of the aforesaid trunk interface control unit 10, through the data storage memory device 52 to the function controller 51 for compression and processing, and processed signals from the function controller 51 are then registered in the data access memory device 53 and then compared with stored voice signal data in the data storage memory device 52, and the corresponding voice signal is therefore retrieved subject to the control of the time sequence controller 54. When the desired digital voice signal is retrieved from the data storage memory device 52, it is converted into a corresponding analog signal by the digital/analog converter 55, and then passed on by the voice output terminal 57 to a voice generating apparatus, whereby the network line connection condition, network line utilization rate, data collision rate and network line inspection condition are reported by voice.

Figure 3:
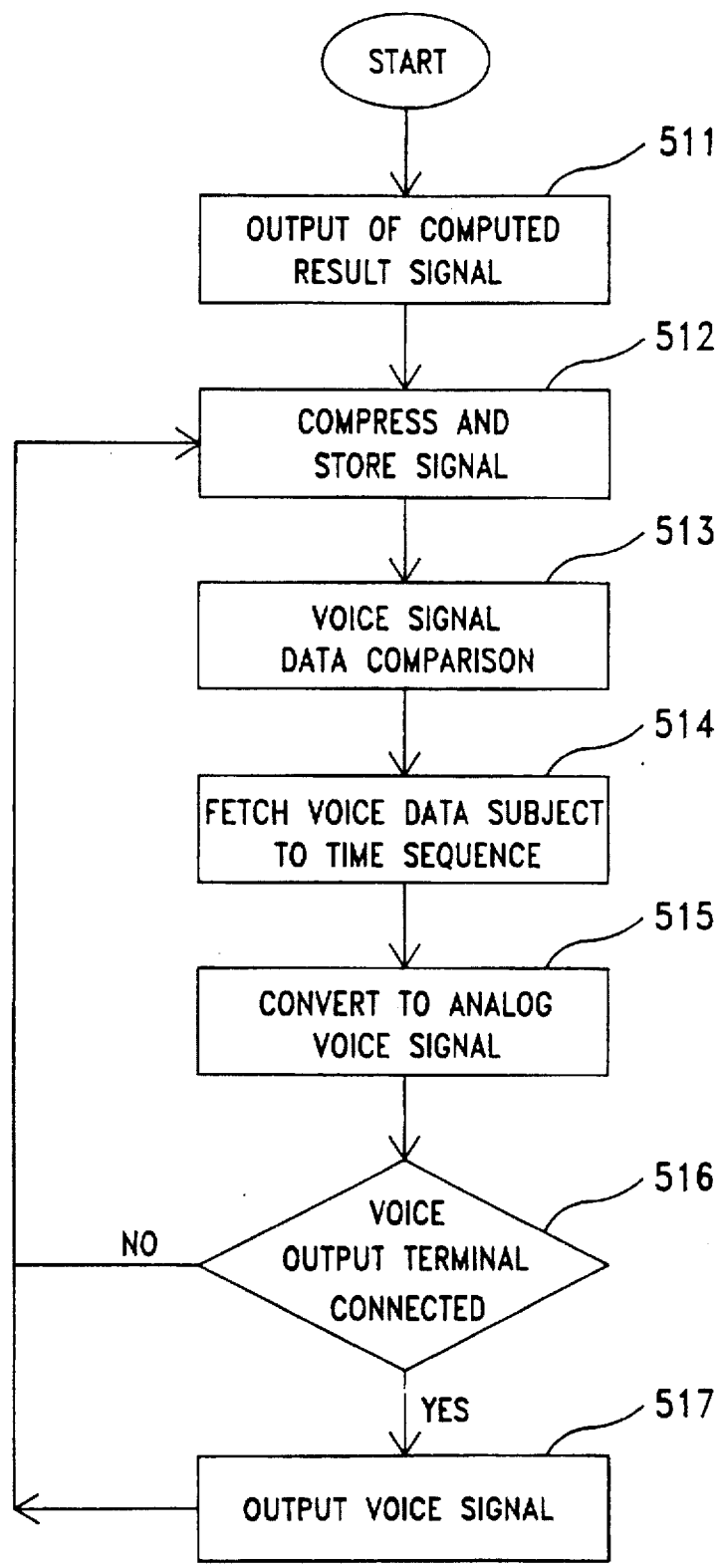
FIG. 3 is an operational flow chart of the voice function control unit shown in FIG. 2.

Referring to FIG. 3, the operational flow of the aforesaid voice function control unit 50 includes the steps of:

511: The I/O bus receives a computed signal;

512: The function controller and the data access memory device compress and store the computed signal;

513: The data storage memory device compares voice signal data stored therein with registered signal in the data access memory device, so as to locate the corresponding voice signal;

514: The time sequence controller drives the data storage memory device to output the retrieved voice signal subject to instruction or control of the time sequence controller;

515: The digital/analog converter converts a voice signal into corresponding an analog signal;

516: The connection between the digital/analog converter and the voice output terminal is checked, and step 517 is run when the checking result is positive, or step 512 is run when the checking result is negative; and, 517: The voice output terminal receives an analog voice signal from the digital/analog converter, and then drives the analog voice signal out.

Besides the network hub, it is adapted to a network switch based on the same structures of the foregoing illustration according to the present invention.

Figure 4:
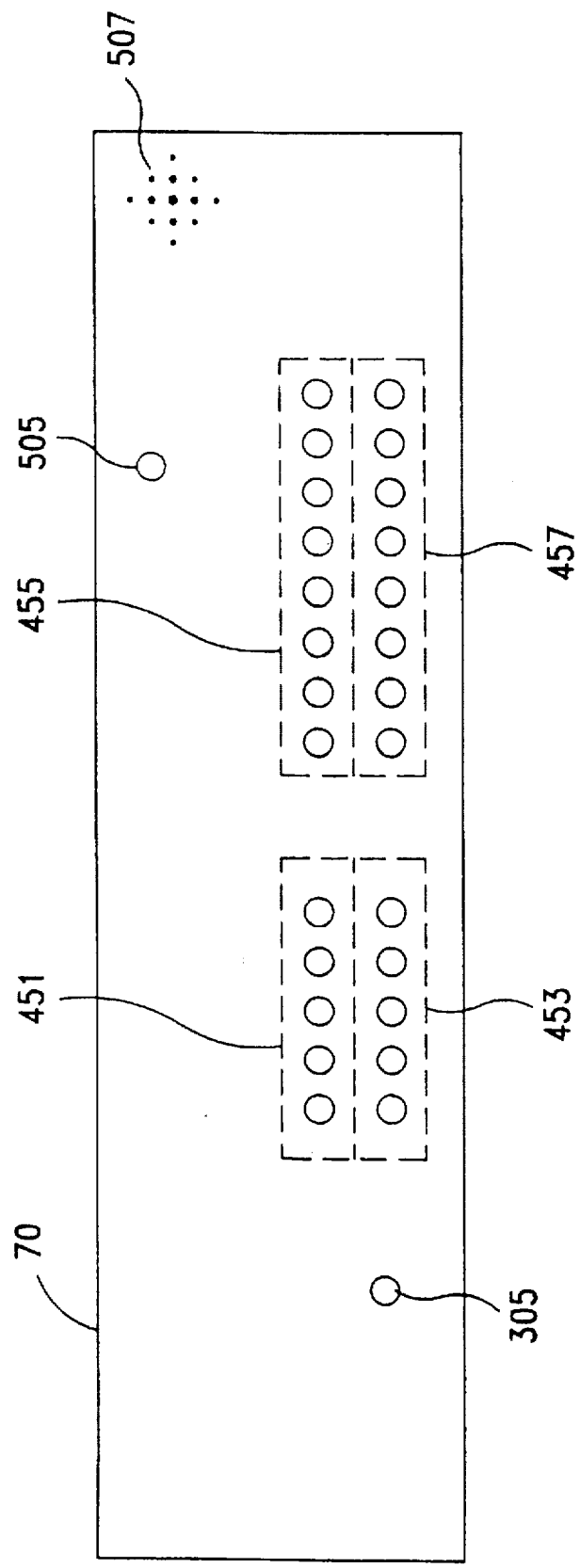
FIG. 4 is a front view of the network hub of the preferred embodiment of the present invention; and, FIG. 5 is a rear side view of the network hub of the preferred embodiment of the present invention.

FIG. 4 is a front view of the network hub according to the present invention. As illustrated, the network hub comprises a housing 70 which protects all elements of the network hub, a plurality of network line utilization rate indicator lights 451, network line collision status indicator lights 453, network line inspection condition indicator lights 455, and network line connection condition indicator lights 457. These indicator lights 451, 453, 455 and 457 are respectively connected to the aforesaid LED controller 45, which is installed inside the housing 70. There is also provided in the housing 70 a power indicator light 305, a voice output control button 505 which is connected to the aforesaid voice function control unit 50 for voice output control, and a voice output port 507.

Figure 5:
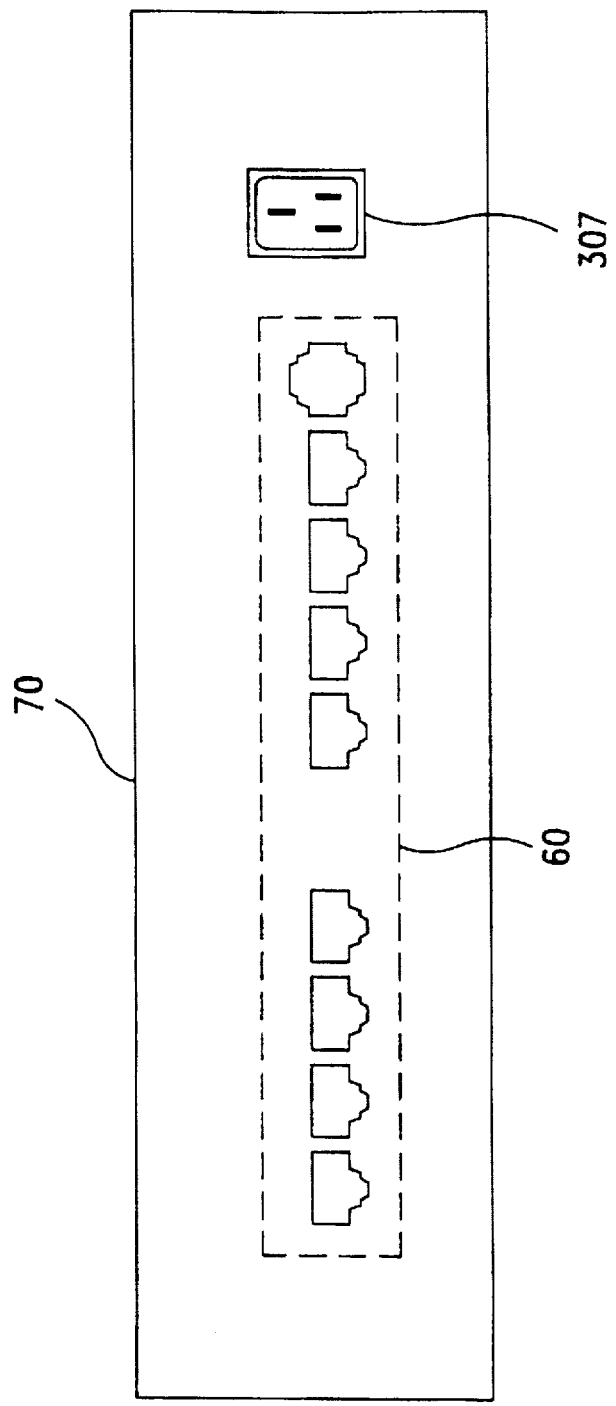

FIG. 5 is a rear side view of the network hub according to the present invention. At the back side of the housing 70, there are provided a power socket 307 for connection to power supply, and a plurality of network line modular jacks 60 for receiving one network line each.

While only one embodiment of the present invention has been shown and described, it will be understood that various modifications and changes could be made thereunto without departing from the spirit and scope of the invention disclosed.

What the invention claimed is:

1. A network hub comprising:

a housing which holds all elements of the network hub;

a trunk interface control unit which is a control center of said network hub for controlling the operation of the other units of the network hub;

a power supply unit connected to said trunk interface control unit to provide the network hub with the necessary operating power;

a plurality of modular jacks adapted for receiving network lines for data input and output;

a plurality of data handling units respectively connected between said trunk interface control unit and said modular jacks for handling input data and output data;

a functional operand unit connected to said trunk interface control unit for calculating network line connection condition, network line utilization rate, data collision rate and network line inspection condition; and a voice function control unit connected to said trunk interface control unit for outputting voice indication of the calculated result of said functional operand unit.

2. The network hub of claim 1 wherein said voice control unit comprises an I/O bus, a function controller, a data storage memory device, a data access memory device, a time sequence controller, a digital/analog converter, and a voice output terminal, said I/O bus being connected to said trunk interface control unit by contact pins, so that said trunk interface control unit can control said voice function control unit for voice output, said data storage memory device being connected to said I/O bus, said data storage memory device and said data access memory device and said function controller being connected into a loop, said time sequence controller and said digital/analog converter being connected in series to said data storage memory device, said voice output terminal being connected to said digital/analog converter for voice signal output.

3. The network hub of claim 1 further comprising a plurality of network line utilization rate indicator lights, network line collision status indicator lights, network line inspection condition indicator lights, network line connection condition indicator lights, a power indicator light, and a voice output port.

4. The network hub of claim 3 further comprising a LED controller controlled by said functional operand unit to drive said indicator lights.

5. The network hub of claim 1 wherein each of said data handling unit comprises a data functional operand unit, a signal converting device and a filter respectively connected in series, said data functional operand unit being connected to said trunk interface control unit, said filter being connected to one modular jack.

6. The network hub of claim 1 further comprising a voice output control button installed in said housing for voice output on/off control.

7. The network hub according to any one of the preceding claims wherein said network hub is adapted to a network switch for the same structure.

* * * * *